United States Patent [19]

Schad et al.

[11] Patent Number: 4,867,938
[45] Date of Patent: Sep. 19, 1989

[54] SEQUENTIAL INJECTION MOLDING PROCESS

[75] Inventors: Robert D. Schad, Toronto; Paul P. Brown, Orangeville, both of Canada

[73] Assignee: Husky Injection Molding Systems, Ltd., Bolton, Canada

[21] Appl. No.: 150,157

[22] Filed: Jan. 29, 1988

[51] Int. Cl.⁴ .............................................. B29C 45/12
[52] U.S. Cl. .............................. 264/297.2; 264/328.8; 264/328.13; 264/334; 425/557; 425/588; 425/595
[58] Field of Search ............... 264/297.2, 328.1, 328.8, 264/328.13, 328.19, 334; 425/595, 572, 581, 588, 557, 558

[56] References Cited

U.S. PATENT DOCUMENTS

| | | | |
|---|---|---|---|
| 3,417,433 | 12/1968 | Teraoka | 264/328.8 |
| 4,146,600 | 3/1979 | Elly et al. | 264/297.2 |
| 4,242,073 | 12/1980 | Tsuchiya et al. | 425/572 |
| 4,400,341 | 8/1983 | Sorensen | 264/328.8 |
| 4,571,320 | 2/1986 | Walker | 425/444 |
| 4,732,554 | 3/1988 | Hellmann | 425/444 |
| 4,734,243 | 3/1988 | Kohama et al. | 425/581 |

FOREIGN PATENT DOCUMENTS 58-181624  10/1983  Japan .................................. 425/572

*Primary Examiner*—Jill L. Heitbrink
*Attorney, Agent, or Firm*—Bachman & LaPointe

[57] ABSTRACT

An injection molding machine and method of operation having a plurality of accessory arrangements for molding a plurality of piece parts in efficient overlapping time cycle using primary and secondary molten plastic injection units, primary and secondary clamping units, a plurality of injection units in various arrays including molding piece parts in reverse or uniform orientation.

10 Claims, 15 Drawing Sheets

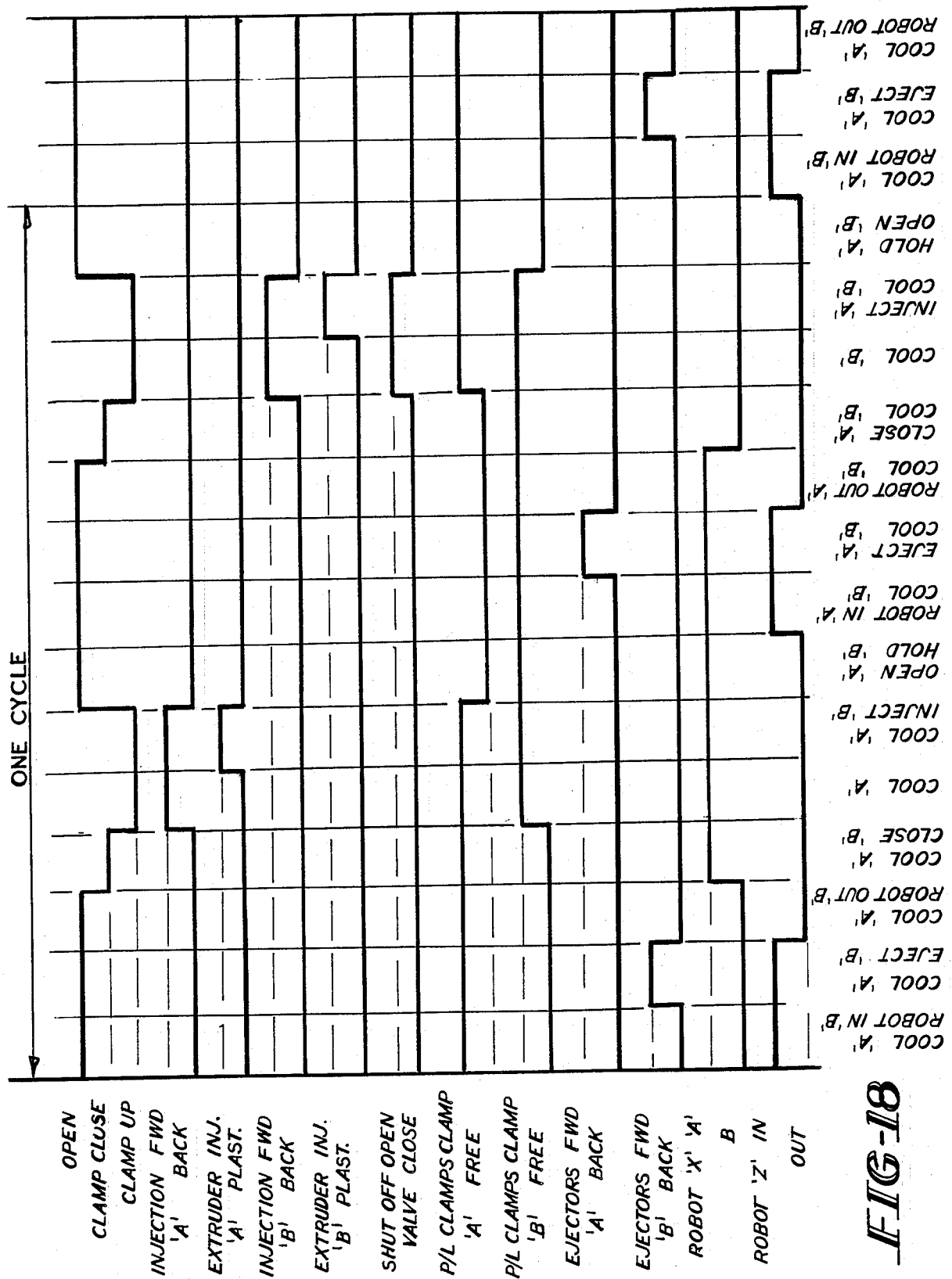

SEQUENTIAL INJECTION MOLDING PROCESS

BACKGROUND OF THE INVENTION

The present invention relates to injection molding machines and relates in particular to such machines having the capability of operating a plurality of molds arranged in series.

The prior art shows injection molding machines having the capability of operating a plurality of molds arranged in series. For example, U.S. Pat. No. 3,707,342, issued to A. Lohman on December 26, 1972 shows two molds spaced apart in tandem with a dual nozzle injection unit positioned therebetween to fill the two molds alternately. No provision is made for separate means to stuff the molds.

An additional prior art patent pertinent to the present invention is U.S. Pat. No. 3,898,030, issued August 5, 1975 to T. G. Bishop entitled Injection-Mold Clamping Unit Having Alternately Ejecting Die Assemblies.

In this disclosure latches 80A and 80B are used to couple separable mold halves 56A and 58A whereby single clamping and ejection units are used for both molds.

A further prior art patent is U.S. Pat. No. Re 28,721 reissued to J. J. Farrell on February 24, 1976 entitled Time Saver Plastic Draw-Back Valve Assembly. This patent discloses a primary reciprocating-screw injection unit 12 and an auxiliary injection piston 50 with a valve 52 for diverting molten plastic flow from the primary unit to the secondary unit thereby isolating the primary unit and permitting the secondary unit to "stuff" mold 32.

Other pertinent machine patents include PCT Publication No. WO 86/01146, dated February 26, 1986 and West German Pat. No. 3428780, dated March 13, 1986.

In addition, the prior art shows stack and sandwich mold arrangements wherein the mold cavity plates are disposed back to back separated by an integral hot runner. Representative of stack mold arrangements are U.S. Pat. Nos. 3,723,040, 3,973,892 and 4,400,341. Stack or sandwich mold arrangements are well known in the art; however, their draw backs include a less than optimum operating cycle and lack of versatility in components. Moreover, there is a disadvantage to combining a hot runner and the cavity plates, for example: this necessitates replacement of a complete multiple mold assembly rather than to replace one cavity plate at a time.

SUMMARY OF THE INVENTION

In contrast to the above prior art disclosures, the present invention relates to an injection molding machine having a plurality of molding stations with a plurality of machine accessories arranged in various combinations developing a sequence of operations calculated to reduce molding cycle time per part particularly when molding large parts such as large containers or auto body parts.

It is a primary feature of the present invention to provide an injection molding machine which enables the mold assemblies to be operable independently of each other and to be readily separable from the machine.

A further feature of the invention is the provision of a plurality of mold stations arranged in series and separated by a discrete, central, movable machine platen.

A further feature of the invention is the incorporation in the central platen of a distributor communicating with whatever mold halves may be attached to said central platen.

It is a further feature of the invention to provide a primary clamping system operable to clamp all mold stations simultaneously.

It is a further feature of the invention to provide an independent secondary clamping system operable to clamp platens of a given mold station directly and selectively or, in the alternative, operable to clamp mold halves of said given station directly and selectively.

It is a further feature of the invention to mount secondary clamps directly upon the mold platens.

It is a still further feature of the invention to feed molten plastic into a plurality of individual mold cavities at different, serially arranged mold stations utilizing a single primary injection means and one or more secondary injection means to fill and pack (stuff) each said mold cavity in sequence thereby increasing overall productivity of individual molds.

It is a further feature of the present invention to use the primary injection means dually as a mold cavity "filler" and a mold cavity "stuffer".

It is a further feature of the present invention to provide a novel sequencing system for utilizing primary and secondary injection means to inject molten plastic into a plurality of mold stations clamped by a single, primary clamping means, where the primary injection means performs both, a mold filling and a stuffing function at one station.

For purposes of claiming this invention the language "single primary clamp" is intended to denote a molding cycle in which the primary clamping means is applied only once during the molding of at least one part at each of at least two individual molding stations.

This language is intended to distinguish from the prior art situation in which at least one part is molded at each of two individual molding stations and the primary clamping means is applied and released at each station independently.

A further feature of the invention is that the primary clamp means may be used solely as a means for moving platens and the secondary clamp means may be the sole mold clamping means.

A further feature of this novel molding sequence is that a part molded at a station A, for example, which is serviced by a primary and a secondary injection means may be of entirely different size and structural complexity than another part molded at a Station B. In accordance with this feature, filling and stuffing of the mold therein may be accomplished sequentially by a single injection means.

A still further feature of the invention is that two parts requiring generally equal cooling periods may be molded with the use of a single primary clamp means. The single primary clamp may act upon two stations in the same time that it would take for a single part to be molded as if the parts were molded successively at two mold stations utilizing primary and secondary clamp means.

A further feature of the invention is the provision of an injection molding machine in which one or more primary injection means are mounted on a fixed or movable platen with track means facilitating motion of the units, to and fro, along the longitudinal axis (x axis) of the machine.

A still further feature of this invention is the incorporation, into an injection molding machine, of a parts removal device or robot which is operable to remove parts molded in reverse or in identical orientation.

A further feature of the invention is the provision of a secondary injection means mounted on a movable platen whose design lends itself to a wide variety of mounting locations on said movable platen.

A further feature of the invention is the provision of an injection molding machine on a single frame means comprising at least two injection means and at least four mold stations arranged in series.

An injection molding machine embracing features of the present invention includes, in one combination or another, a main frame, fixed and movable platens to support mold halves and primary and secondary clamp means. The secondary clamp means are usually attached to the mold platens; however, if necessary they may also be mounted directly on mold halves that are attached to the platens.

A distributing manifold is incorporated in a central movable platen including valve means for directing molten plastic to opposed mold stations. The manifold includes a connection to a primary injection means and to a secondary injection means with appropriate valve means for controlling flow from the primary injection means.

In an alternative embodiment of the machine, the primary injection means is programmed to melt sufficient plastic to fill two molds. A first mold is then filled by the primary injection means and stuffed by a secondary injection means. Next, molten plastic flow is directed to a second mold station where the filling of the mold as well as the stuffing step is performed solely by the primary injection means. In this embodiment the clamping function may be solely by the primary clamp means or by the primary clamp means in combination with secondary clamps, depending upon size, configuration and relative cooling rates of the respective molded parts.

Further, the machine includes ejection means and a parts remover (robot) which operates on rectilinear coordinates to move from molding station to molding station along a first axis and into and out of an open mold along a second axis.

Product may be molded in the same or in reverse orientation with appropriate modification of the parts remover and the flow path of the molten plastic.

In reverse orientation the remover head carries dual "pick up" elements, while product molded in same orientation is grasped by a remover head with a single pick up.

In certain situations, the size and complexity of the molded parts require the use of a plurality of primary injection means adapted to cooperate with a plurality of secondary injection means to insure complete filling and stuffing the corresponding mold cavity in a given mold station.

A further embodiment of the machine takes the form of a double capacity unit. In this arrangement there are four molding stations, two primary injection means and two central platens, each incorporating a distributor.

Other features and advantages of the present invention will become more apparent from an examination of the succeeding specification when read in conjunction with the appended drawings, in which;

DETAILED DESCRIPTION OF THE DRAWINGS

FIG. 18 is a cycle chart for the FIG. 17 modification.

DETAILED DESCRIPTION OF THE PREFERRED EMBODIMENTS

Figure 1:
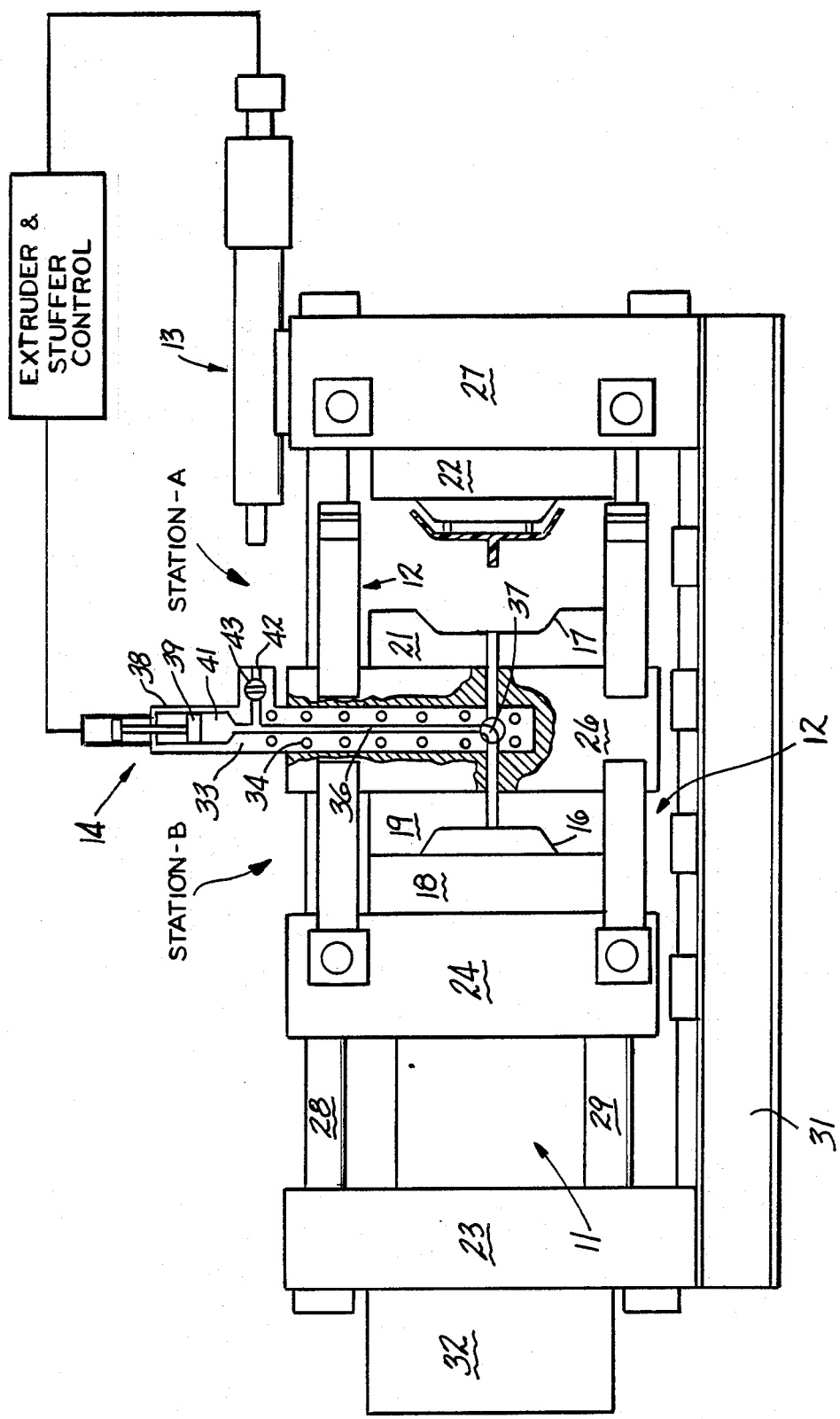
FIG. 1 shows a side view of a typical lay out of the sequential molding machine of the present invention with the distributor block broken away for clarity.
Figure 2:
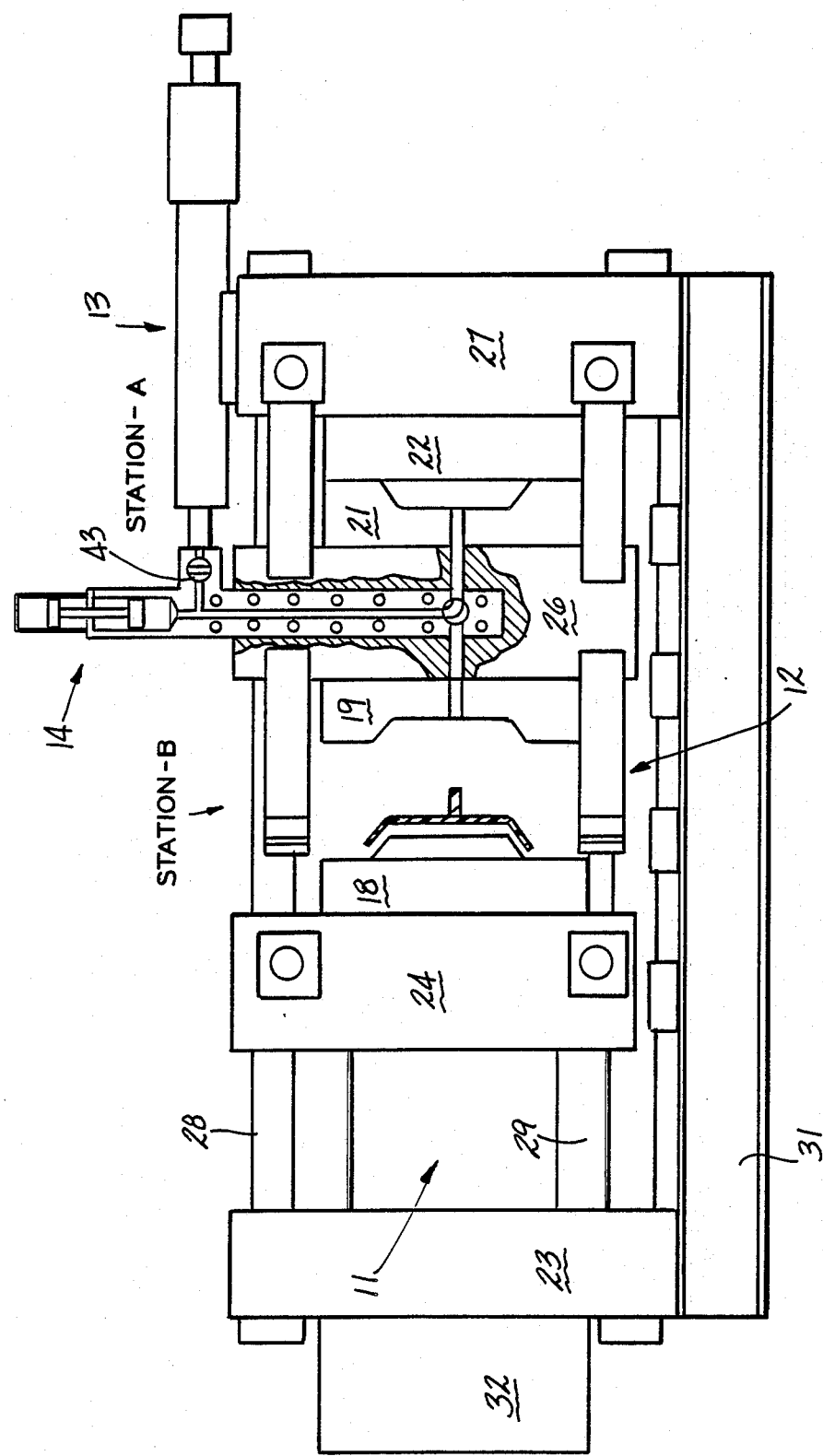
FIG. 2 is a view similar to FIG. 1 showing the opposite molding station open with the molded part poised for removal.
Figure 3:
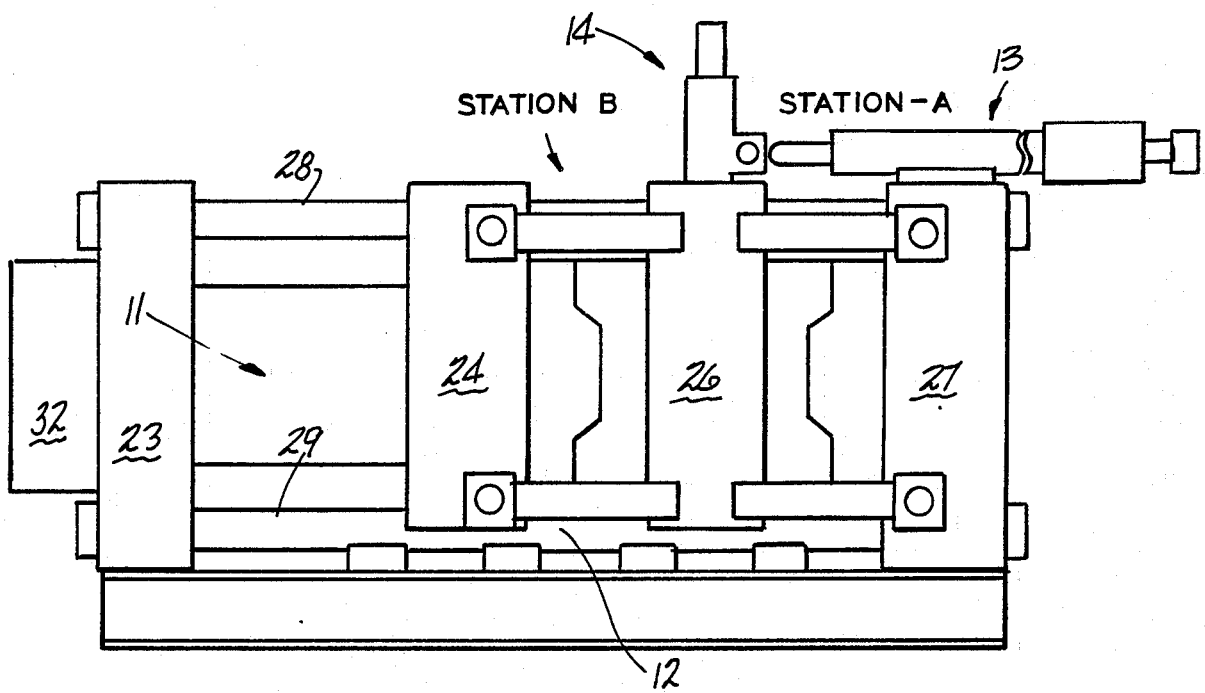
FIG. 3 is an additional side view showing both mold stations in the closed condition with primary and secondary clamp means in operation.

Referring to FIGS. 1, 2 and 3, a basic embodiment of the injection molding machine of the present invention is disclosed comprising molding stations A and B having essential accessories defining a primary clamp section 11, a secondary clamp section 12, a primary molten plastic injection section 13 and a secondary injection section 14. Either the primary and/or secondary injection unit may be of the reciprocating screw type or piston type.

Molds 16 and 17, frequently of different configurations, comprise mold halves 18 and 19 and 21 and 22, respectively.

Mold halves 19 and 21 are mounted on central movable platen 26 and halves 18 and 22 are mounted on movable platen 24 and fixed platen 27, respectively.

Platens 23 and 27, fixed to the machine frame 31, support tie bars 28 and 29 in the usual and customary fashion.

Platen 24 is connected to primary clamping piston 32 and is reciprocated thereby sliding on tie bars 28 and 29.

Central platen 26 is also movable on tie bars 28 and 29 and is releasably connected to movable platen 24 and fixed platen 27 by secondary clamping means 12 in a manner which will be explained in greater detail as this specification proceeds.

Machine section 14 includes a distribution block 33 incorporated in platen 26, with heating elements 34, molten plastic supply channel 36 and selector valve 37 for diverting compound flow from station A to station B and vice versa.

The distributor block 33 terminates in a cylinder 38 having a piston 39 and a reservoir 41.

A second channel 42, adapted to make a connection with a reciprocating primary injection section 13, as is most apparent in FIG. 2, includes a shut off valve 43 for cutting off molten plastic flow from the primary injection means.

With the piston 39 in the retracted position, as shown in FIG. 1, the molten plastic advanced by the injection section 13 operates to fill the mold cavity to which selector valve 37 is set (station B in FIG. 1) and simultaneously fills reservoir or accumulator 41. Upon closure of shut off valve 43, isolating the injection section 13, actuation of the piston 39 is operable to "stuff" the mold cavity to which molten plastic was initially directed.

Obviously the reservoir can be reestablished and recharged upon retraction of the piston 39 in preparation to charge the opposite mold cavity.

Typically, the injection section 13 includes a plasticizing-injection unit referred to in the art as a reciprocating-screw extruder.

Figure 4:
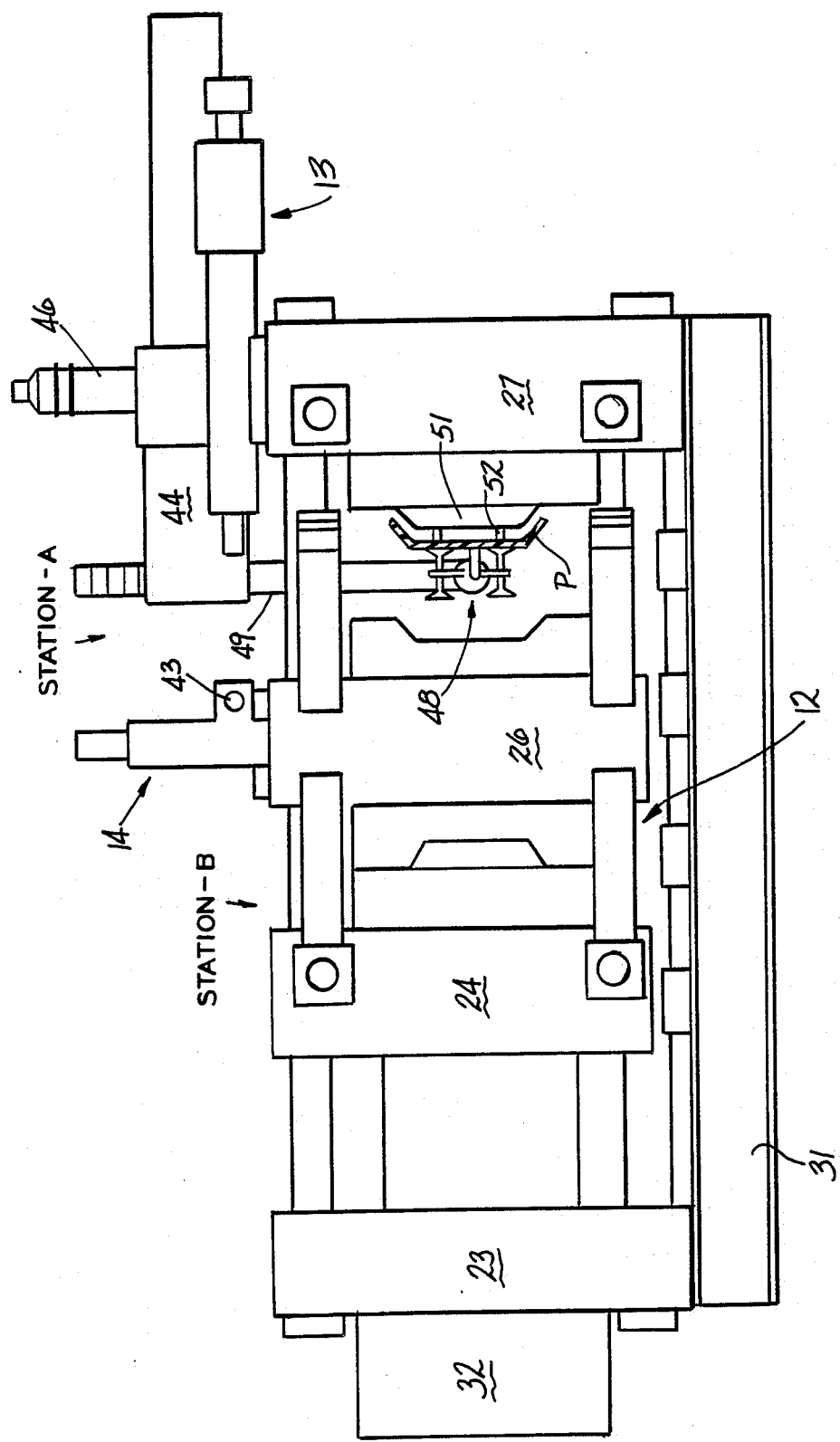
FIG. 4 is a side of the machine with the molded parts remover or robot in an open mold retrieving a part.
Figure 5:
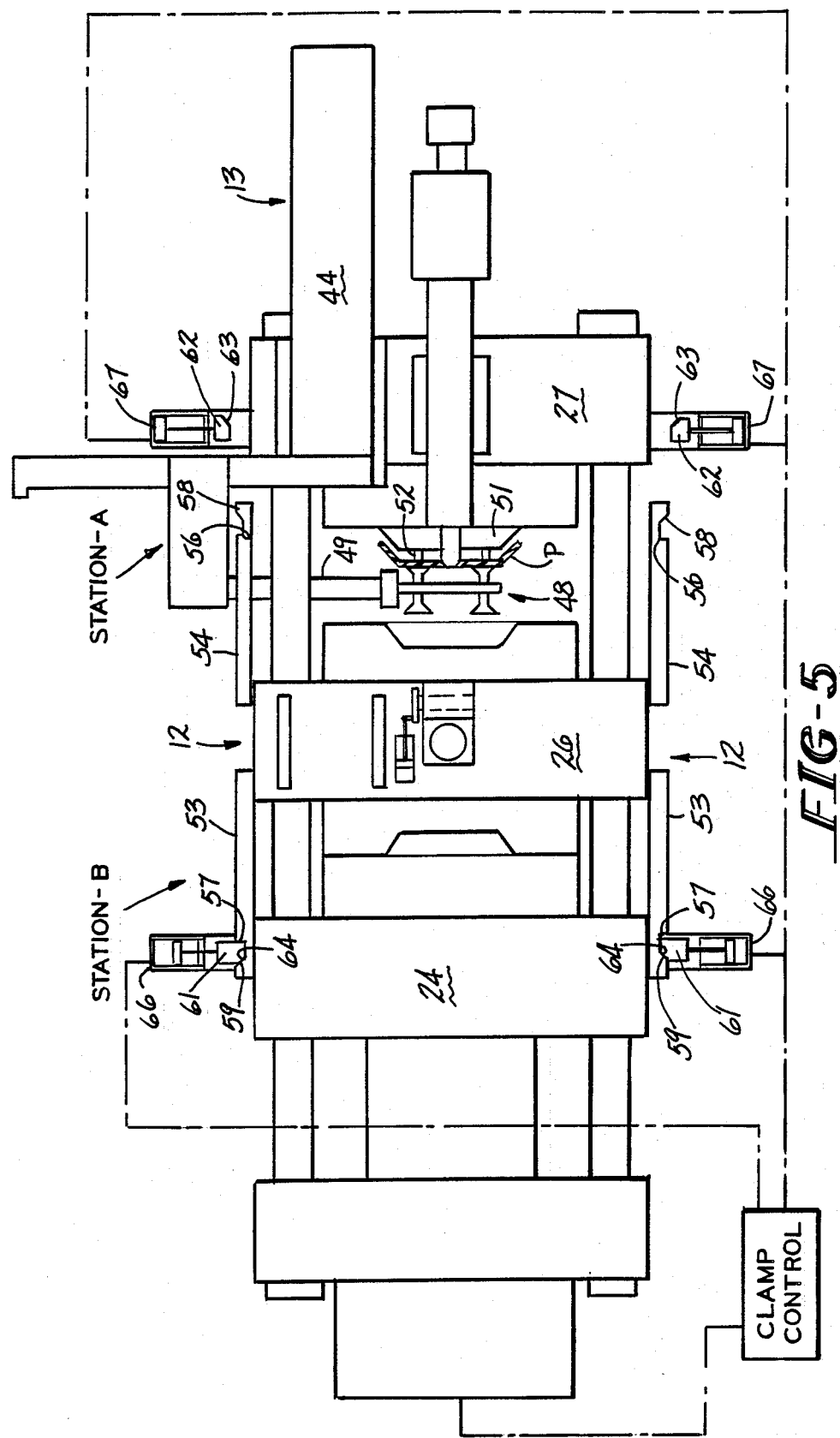
FIG. 5 is a top plan view of the illustration of FIG. 4.
Figure 6:
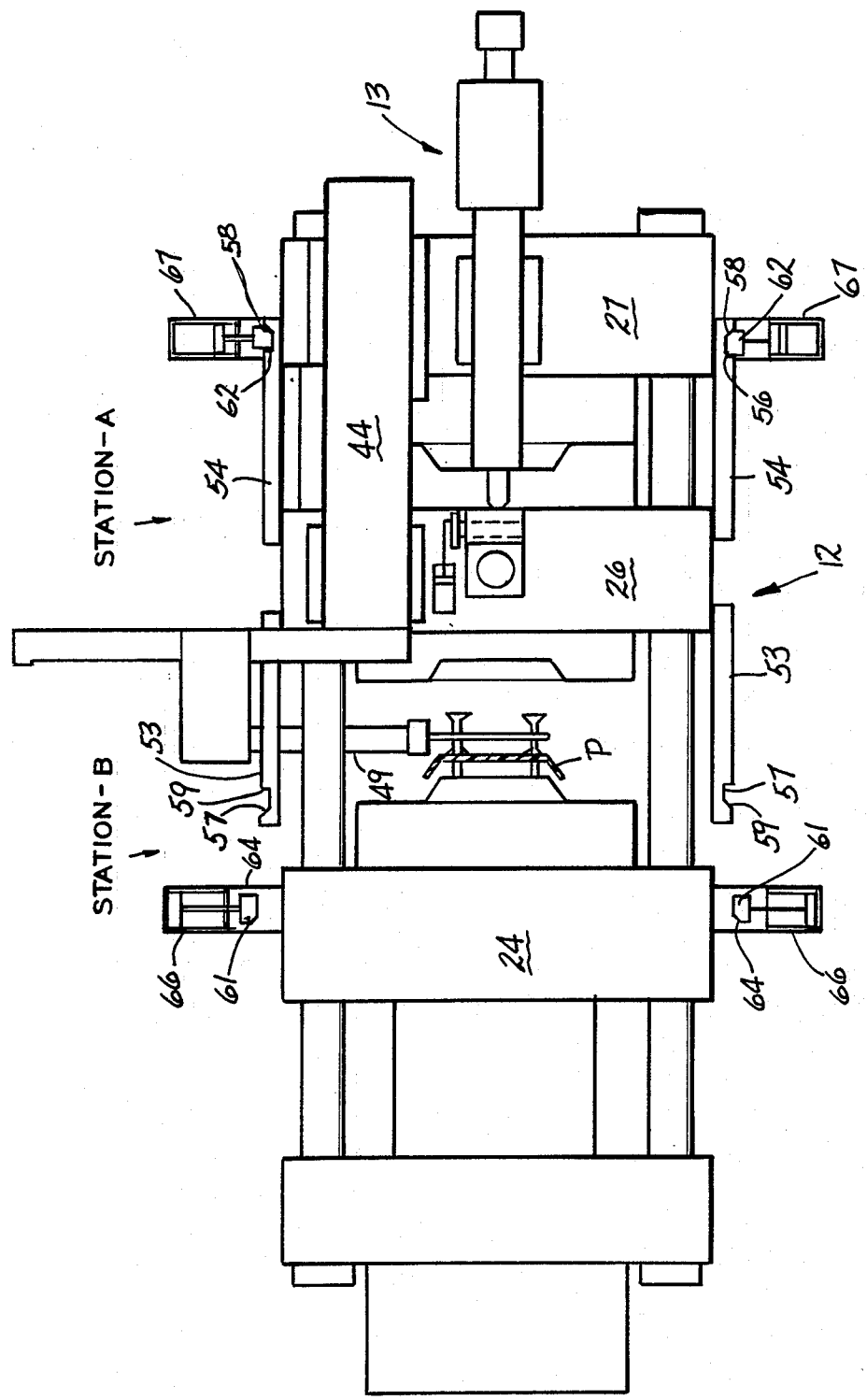
FIG. 6 is similar to FIG. 5 showing the robot in the opposite molding station.

FIGS. 4, 5 and 6 are similar to FIGS. 1, 2 and 3 and show details of one embodiment of the secondary clamp means and the structure and operation of the molded parts removal unit or robot.

Referring to FIG. 4, the parts removal unit operates automatically in timed sequence, in robot fashion, and includes a first leg 44 which reciprocates under control of power unit 46 along the longitudinal axis (x axis) of the machine guided by a track (not shown). The power unit 46 is supported by fixed platen 27.

When the part removal head 48 is in register with an open mold, such as the open mold in station A in FIG. 4, a second leg 49 is actuated by suitable power means to advance the head along a second axis (z axis) into register with finished part P. The part is then ejected from core 51 by ejector pins 52, in well known fashion, and picked up by the head.

The head 48 is provided with a source of vacuum and a valve operable to direct vacuum to the part side of the head whereupon the part P is grasped and drawn away from the core by the head. The head is retracted automatically and the part P released to an appropriate container (not shown) for packaging or further processing, as the case may be.

FIG. 5 and 6 are top plan views of the illustration of FIG. 4 and show details and operation of one embodiment of the secondary clamp section indicated generally by the reference numeral 12.

Pairs of opposed arms 53 and 54, fixed to central platen 26, are formed with notches 56 and 57 and cam faces 58 and 59. The notches are engaged by dogs or lugs 61 and 62 having mating cam faces 63 and 64. The lugs 61 and 62, operable to reciprocate in timed sequence under the control of piston-cylinder assemblies 66 and 67, are mounted on the movable platen 24 and fixed platen 27, respectively.

Figure 7:
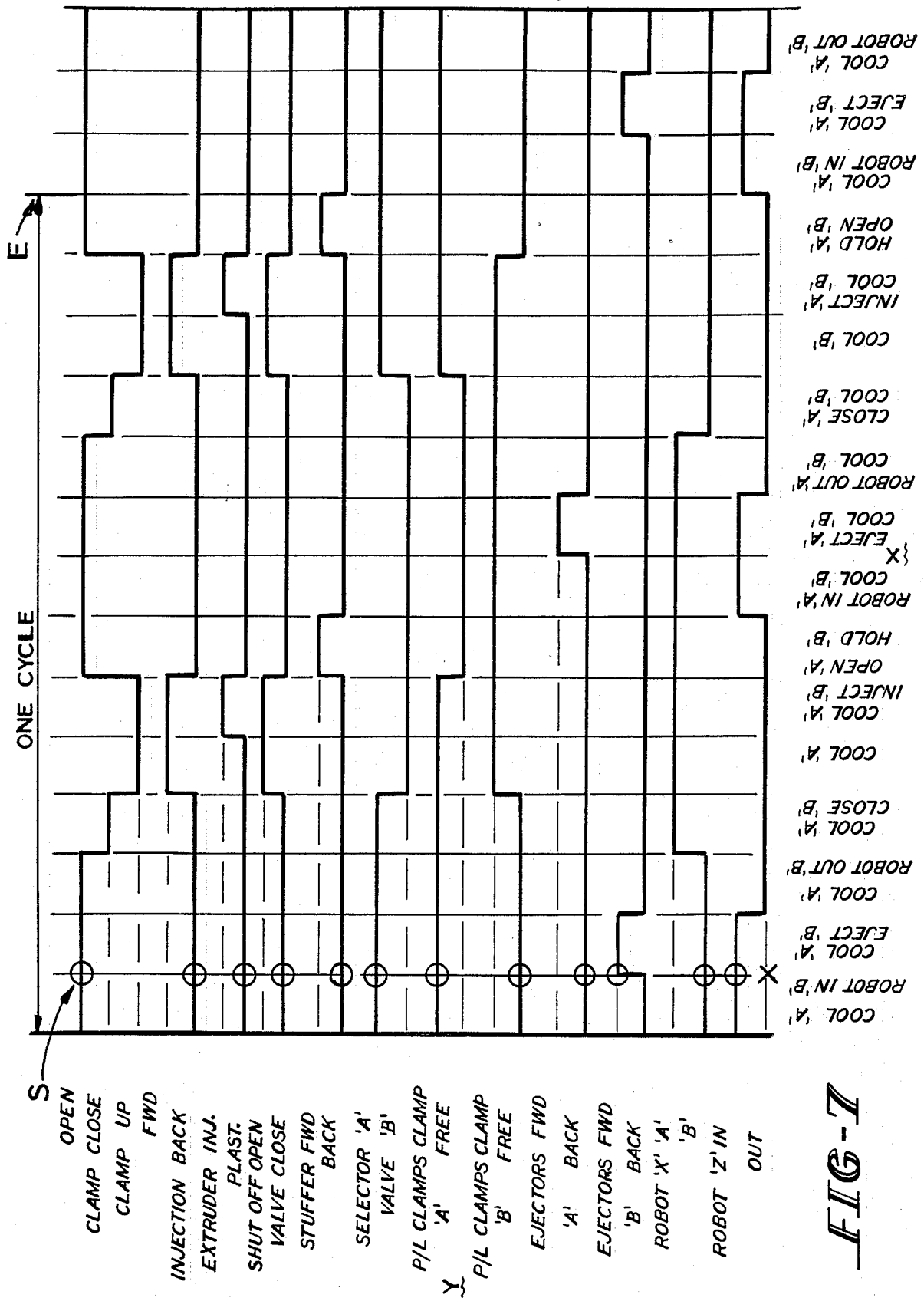
FIG. 7 is a plot of the machine sequence of operation charting the position of the various machine accessories against the step by step generation of the molded parts.

As mold halves of a given mold station approach their closed position, the lugs move into mating notches and the mating cam faces engage one another to drive the mold halves into tight face to face contact holding the mold halves sealed during cavity stuffing and subsequent cooling period independently of the primary clamp means in a manner and according to an operating sequence set forth in the cycle chart of FIG. 7.

FIG. 6 shows the part removal hand 48 in place in the open mold at station B poised to retract from the mold to transfer part P out of the machine.

In this position the vacuum of the head 48 has been diverted from the right side of the head to the left side of the head as viewed in FIG. 6 to accomplish the part pick up at station B.

Referring in detail to FIG. 7, a plot shows a typical molding cycle of the machine of FIGS. 1 through 6 is laid out coordinately where the y axis is a schedule of sequential positions of the various machine components or accessories for stations A and B, and the x axis is a schedule of the progress of the part through the molding steps.

The chart is read in the following fashion: starting at the upper left hand corner at the point indicated by the letter S, one "picks up" the molding cycle by noting the small circles extending along the y axis which indicate that primary clamp 11 is open, injection section 13 is back (to the right in FIG. 4), the injection section 13 is plastericizing, shut off valve 43 is closed, secondary injection section 14 (stuffer piston 38) is retracted, selector valve 37 is open to station A, secondary clamp section 12 is clamping station A, second clamp 12 at station B is free (open), ejector pins 52 are retracted at station A, ejector pins 52 are forward (ejecting) at station B, robot or pick up head 48 has moved along machine x axis to station B and along the z axis into the mold at station B.

Referring to the point x at the lower left corner of the chart of FIG. 7, it is apparent when the various machine elements are in the positions just indicated by "reading" the chart a molded part is cooling in its mold at station A and the robot or pick up head 48 is positioned in the open mold at station B.

The chart is read in the manner described incrementally from left to right, the machine having produced two parts P upon arriving at end E of a complete cycle.

Figure 8:
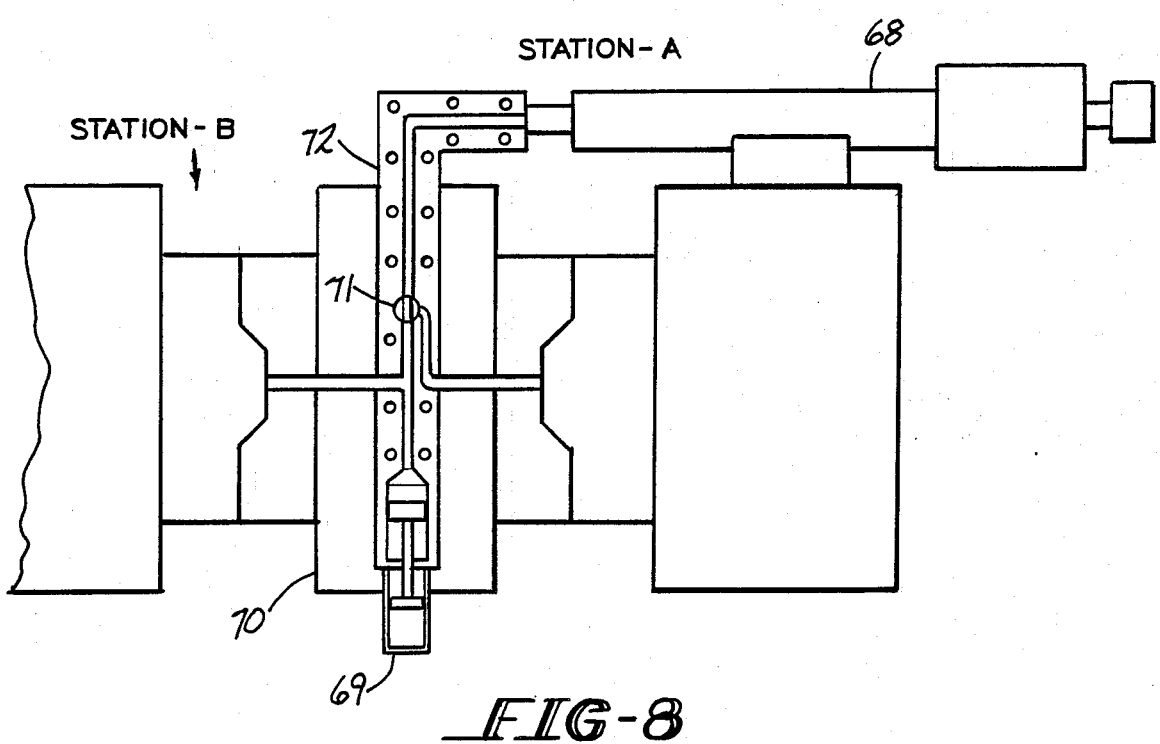
FIGS. 8, 9 and 10 show an alternative arrangement of primary and secondary injection means serving two molding stations.
Figure 10:
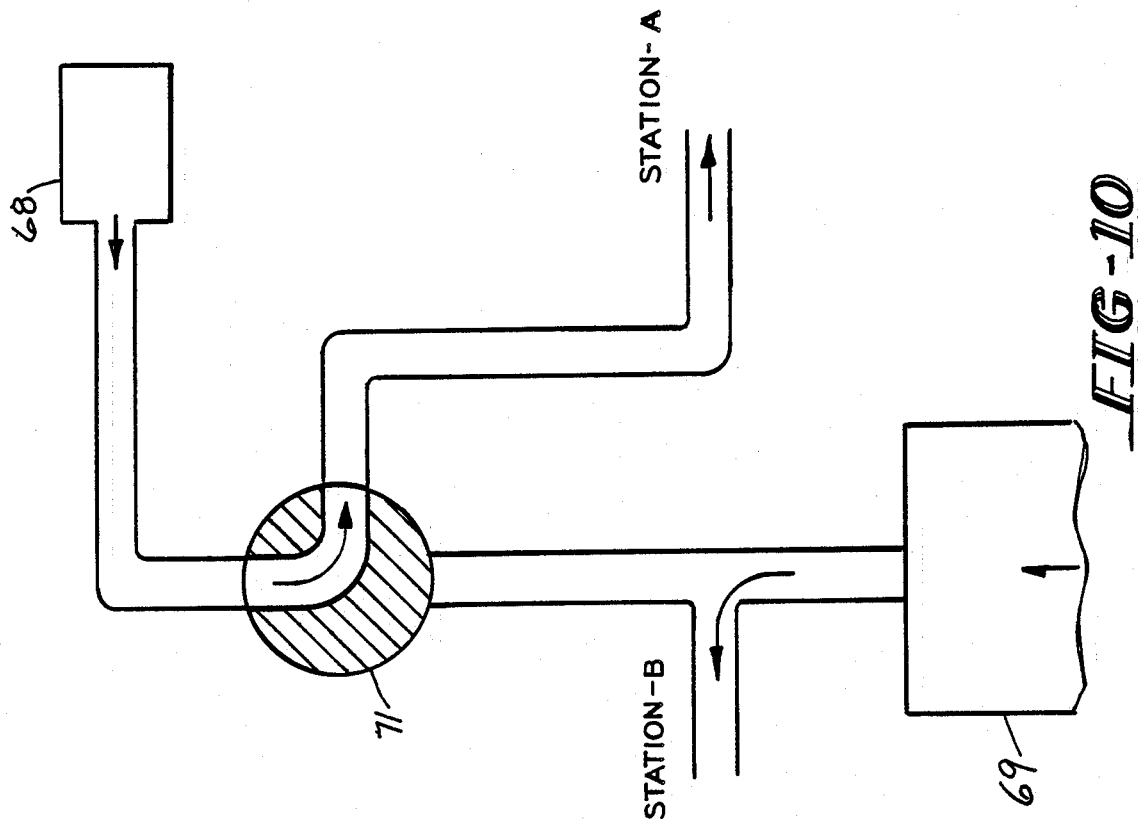
Figure 9:
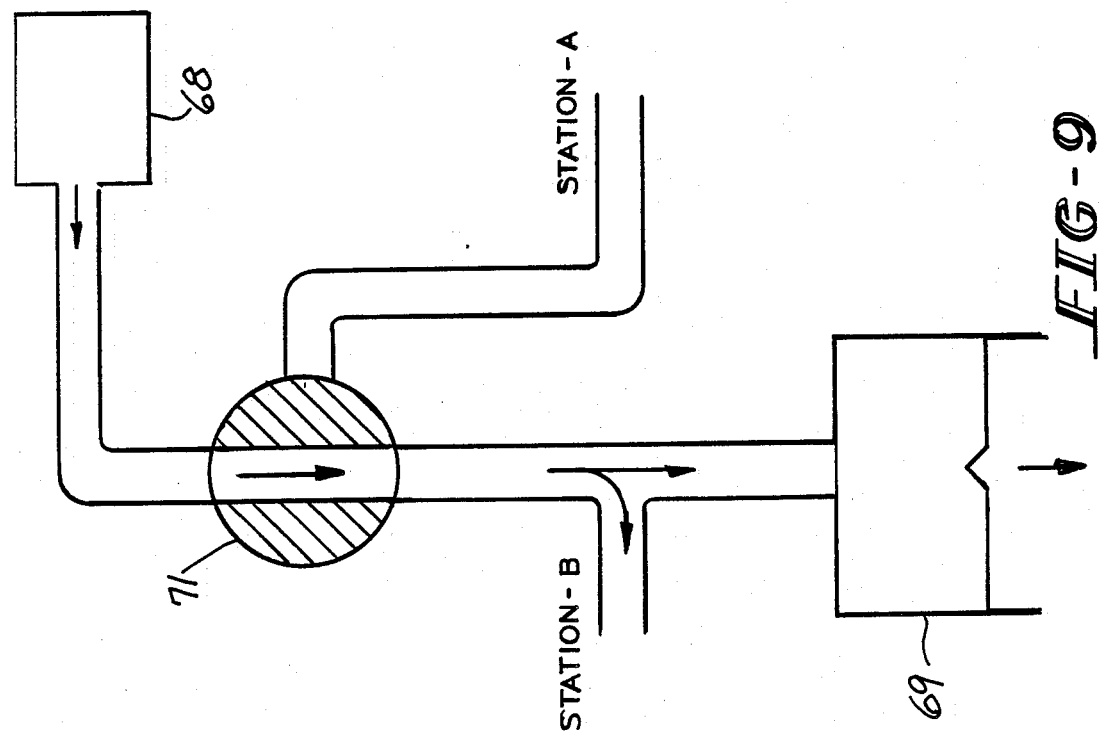

Referring now to FIGS. 8, 9 and 10, alternative embodiment of the primary and secondary injection means is disclosed schematically. In this arrangement molding stations A and B are serviced by an injection unit 68 and secondary injection unit 69. A selector valve 71, (shown as a two way valve but which may be a three way valve) disposed in distributor block 72 within platen 70, is operable to divert the flow of molten plastic from injection unit 68 to the mold at station B as indicated schematically in FIG. 9 or to the mold at station A as indicated schematically in FIG. 10. Thus, operation of the injection unit in the FIG. 9 arrangement delivers molten plastic simultaneously to the mold of station B and to the secondary injection unit 69. At the appropriate interval selector valve 71 directs the molten plastic to mold station A while injection continues into station B from the secondary injection unit. The significance of this arrangement is that (1) the primary injection unit is programmed to prepare sufficient plastic to satisfy the molds of both mold stations A and B; (2) the secondary injection unit 69 completes injection into the mold at station B after selector valve 71 shifts the flow of plastic to station A; (3) molten plastic is delivered directly to station A from the primary injection unit to complete the injection, whereby either the primary and/or secondary unit may serve as a stuffer. For example, as a variation of this embodiment one may also stuff station A with secondary injection unit 69 with appropriate valving.

Either the primary or secondary injection units may be of the reciprocating screw type or the piston type.

Injection pressure of molten plastic into a mold cavity to fill a mold cavity is frequently of a level ranging from 15,000 to 21,000 psi and injection pressure to "hold or stuff" the cavity to compensate for shrinkage is frequently of the order of 6,000 psi.

These pressure levels can be developed by primary and/or secondary injection means.

When piece parts molded at stations A and B have substantially uniform or equal cooling periods, secondary clamping means (parting line clamps) can be eliminated and the molds of station A and B are held clamped by the primary clamping unit and both molds are opened simultaneously.

In situations where the cooling periods are unequal it is necessary to use parting line clamps in addition to primary clamp.

Figure 11:
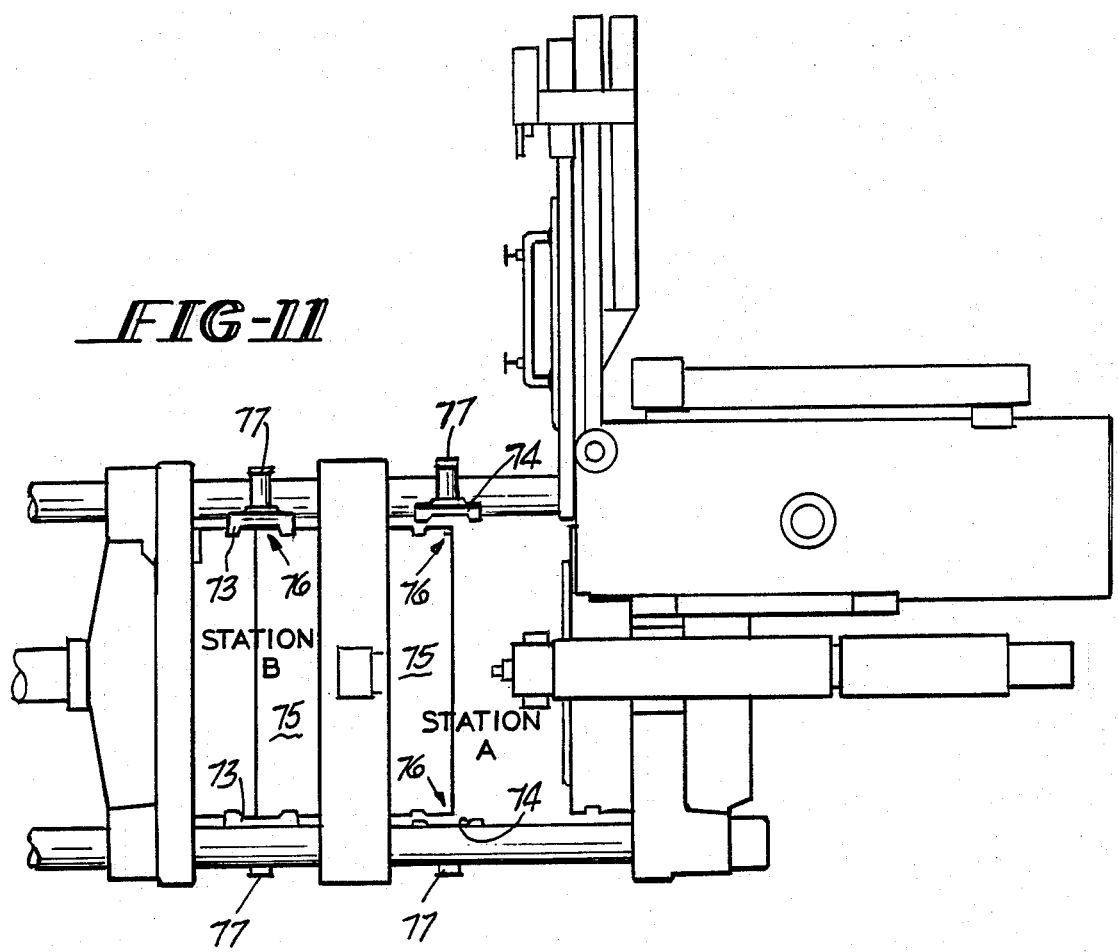
FIG. 11 is a plan view of an injection molding machine with an alternative secondary or parting line clamp structure.
Figure 12:
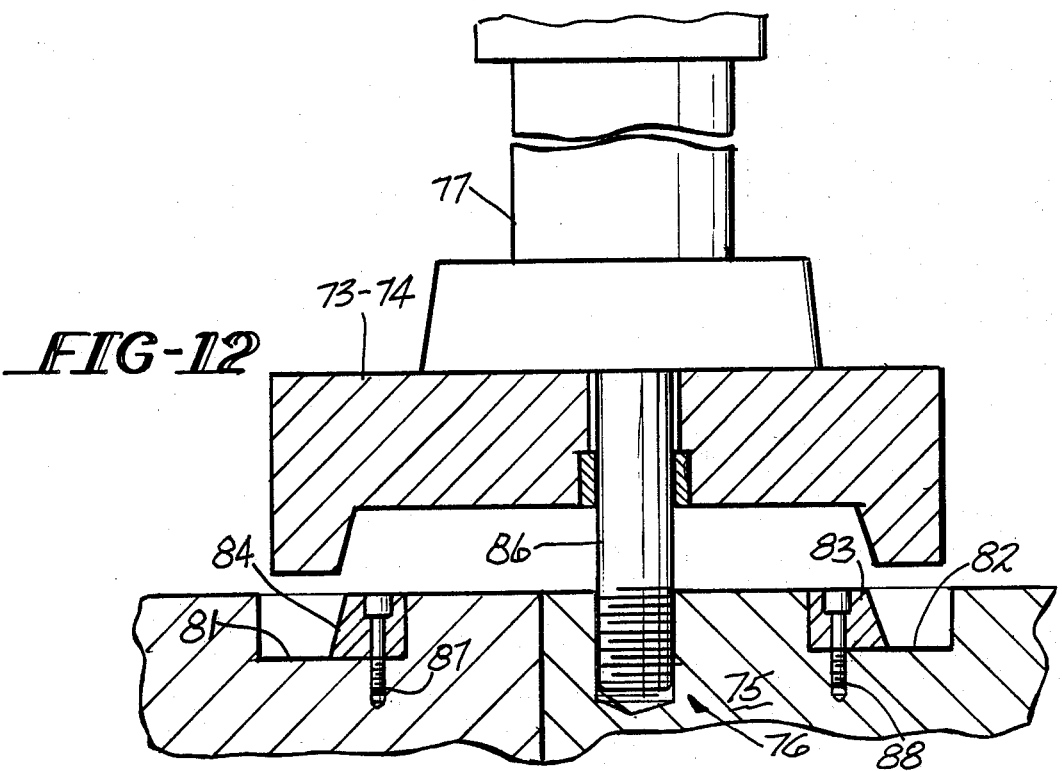
FIG. 12 is a schematic illustration of details of the structure and mounting means of the alternative secondary clamp of FIG. 11.

Referring now to FIGS. 11 and 12, an alternative design for a secondary clamping unit is disclosed wherein parting line clamp elements 73 and 74 are shown mounted on mold halves 75 as at 76 shown in FIGS. 11 and 12. The units at station A and station B are of identical structure. Therefore, only one modified secondary clamping unit will be described.

The clamp elements 73 and 74 are operated by a piston-cylinder arrangement 77 on opposite sides of a mold station such as is shown at stations A and B in FIG. 11. Mating mold halves are formed with cut outs or recesses 81 and 82 fitted with hardened inserts 83 and 84 secured to mold halves by bolts 87 and 88. Each insert is formed with a taper mating with a corresponding taper on the complementary clamps 73-74. Actuation of the cylinder unit 77 moves the clamps on opposite sides of the molds along a piston rod 86 (fixed to a mold half as at 76) from a retracted position of FIG. 12 to an operating position shown in FIG. 11 driving the mold halves into face to face contact under very high compressive stress.

Note that the parting line clamp structure of FIGS. 11 and 12 is mounted directly on the mold halves and operates directly on the mold halves, in contrast to the secondary clamp structure described previously which is mounted on the mold platens and operates directly on the mold platens.

Obviously, any of a number of arrangements may be devised in mounting the secondary clamping arrangement on the mold halves as engineering and other design considerations dictate.

Figure 13:
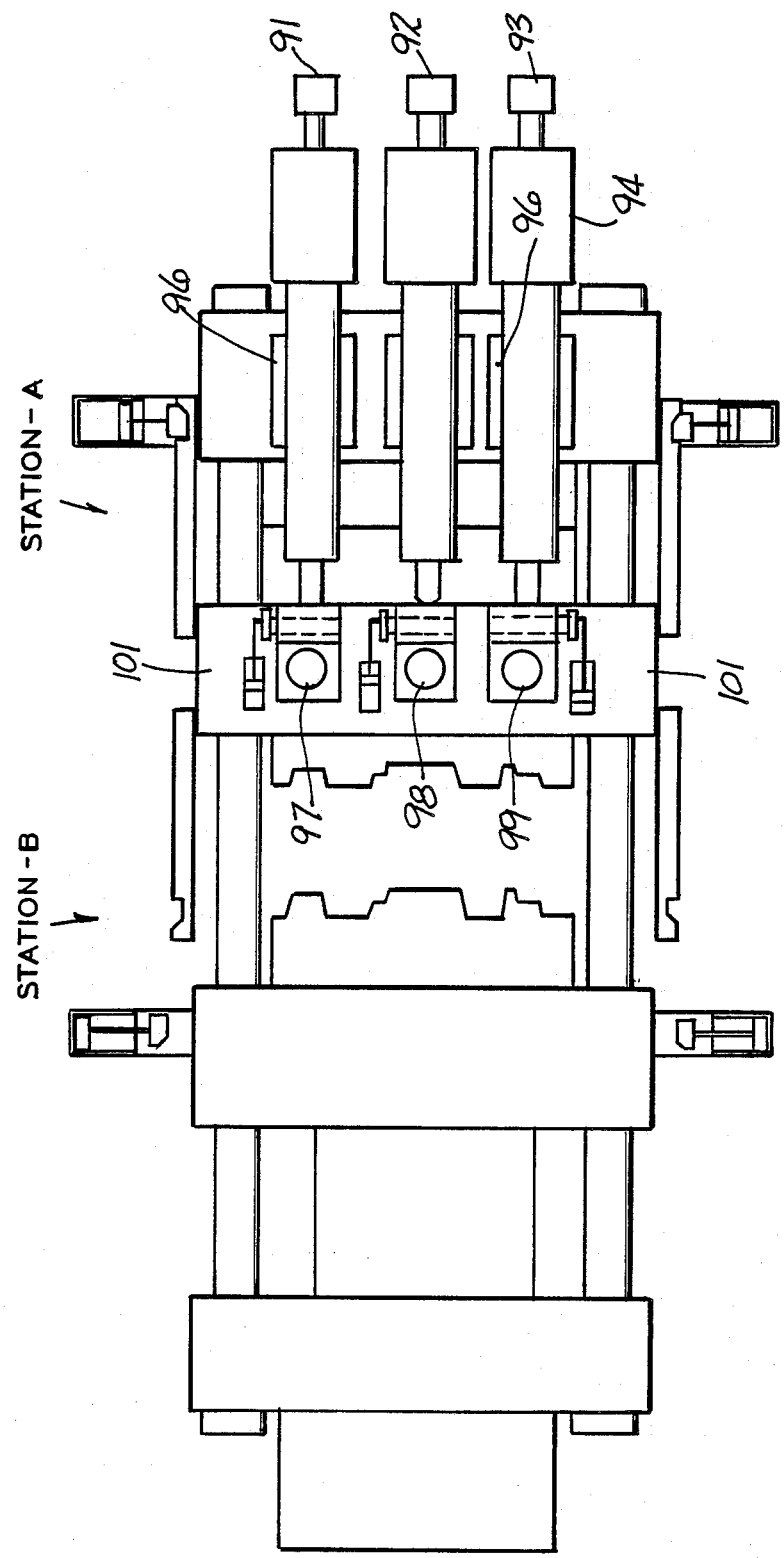
FIG. 13 is a plan view of a machine modification in which a plurality of primary injection means are utilized in combination with a plurality of distributor blocks and corresponding secondary injection means.

Referring to FIG. 13, a further alternative embodiment of the injection molding machine is disclosed wherein the open mold configuration at station B represents a large, complex part. In order to insure adequate filling and stuffing, a machine modification is arranged wherein a plurality of primary injection units 91, 92 and 93 are mounted on the top of fixed platen 94. Suitable tracks 96 are provided for advancing the injection units to and fro to make appropriate connection with mating secondary injection units or stuffers 97, 98 and 99 incorporated in a central movable platen 101. Thus, in operation the primary injection units and cooperating stuffer units are operable individually or collectively in various combinations and permutations as design complexity of the molded parts dictate.

.Obviously, the position and number of the primary injection and cooperating stuffer units is a matter of choice consistent with part retrieval, overall length of machine, floor space and so forth.

Figure 14:
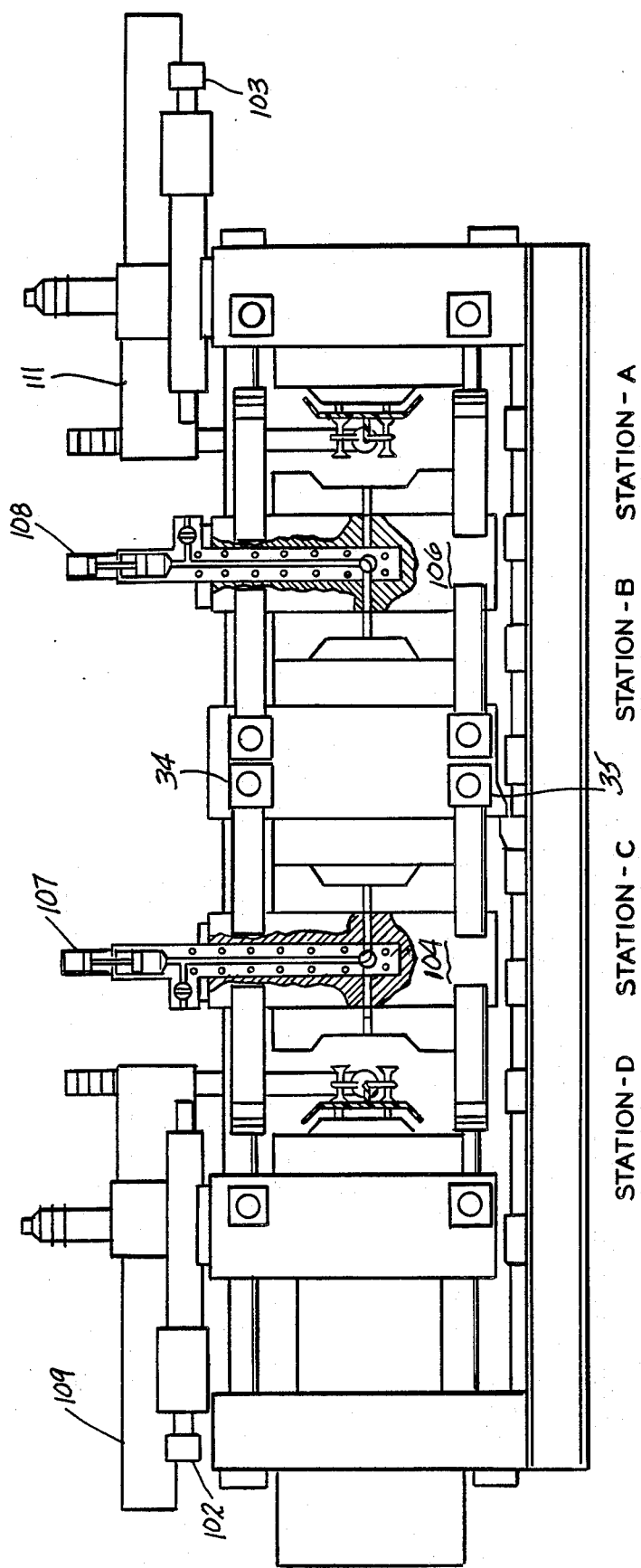
FIG. 14 is a side view of an additional machine modification shows double sets of primary and secondary injection means and robots servicing four mold stations.

FIG. 14 illustrates a double capacity machine in which there are four molding stations A, B, C and D, two opposed primary injection extruders 102 and 103 with two central mold platens 104 and 106 each incorporating a secondary extrusion units or stuffers 107 and 108, in the fashion and for the purpose previously described, for servicing mold stations D and C on the left and mold stations B and A on the right, respectively. The reference numerals 109 and 111 designate mold part removal units or robots. Naturally, each mold station could have a plurality of molds as required.

Hereagain, the location of primary injecting units is a matter of design choice based on machine size limitations and available operating space.

The machine configuration of FIG. 14 shows the molds open at stations A and D while the molds at stations B and C are closed.

Figure 15:
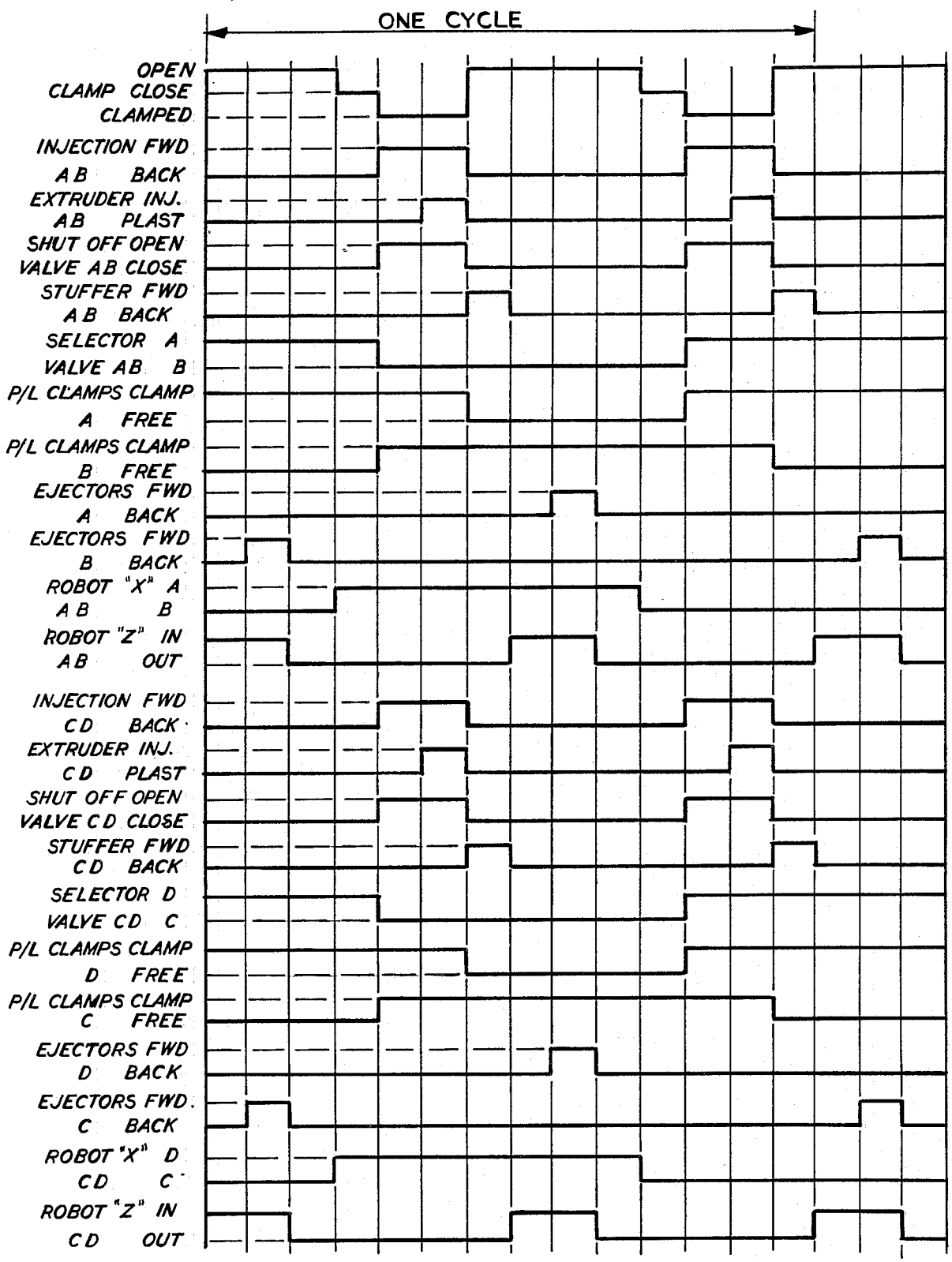
FIG. 15 is a chart detailing the operating sequence of the machine of FIG. 14.

FIG. 15 is an operating schedule showing the sequential positions of the various machine accessories as the double capacity unit of FIG. 14 operates to produce four molded parts per cycle.

Figure 16:
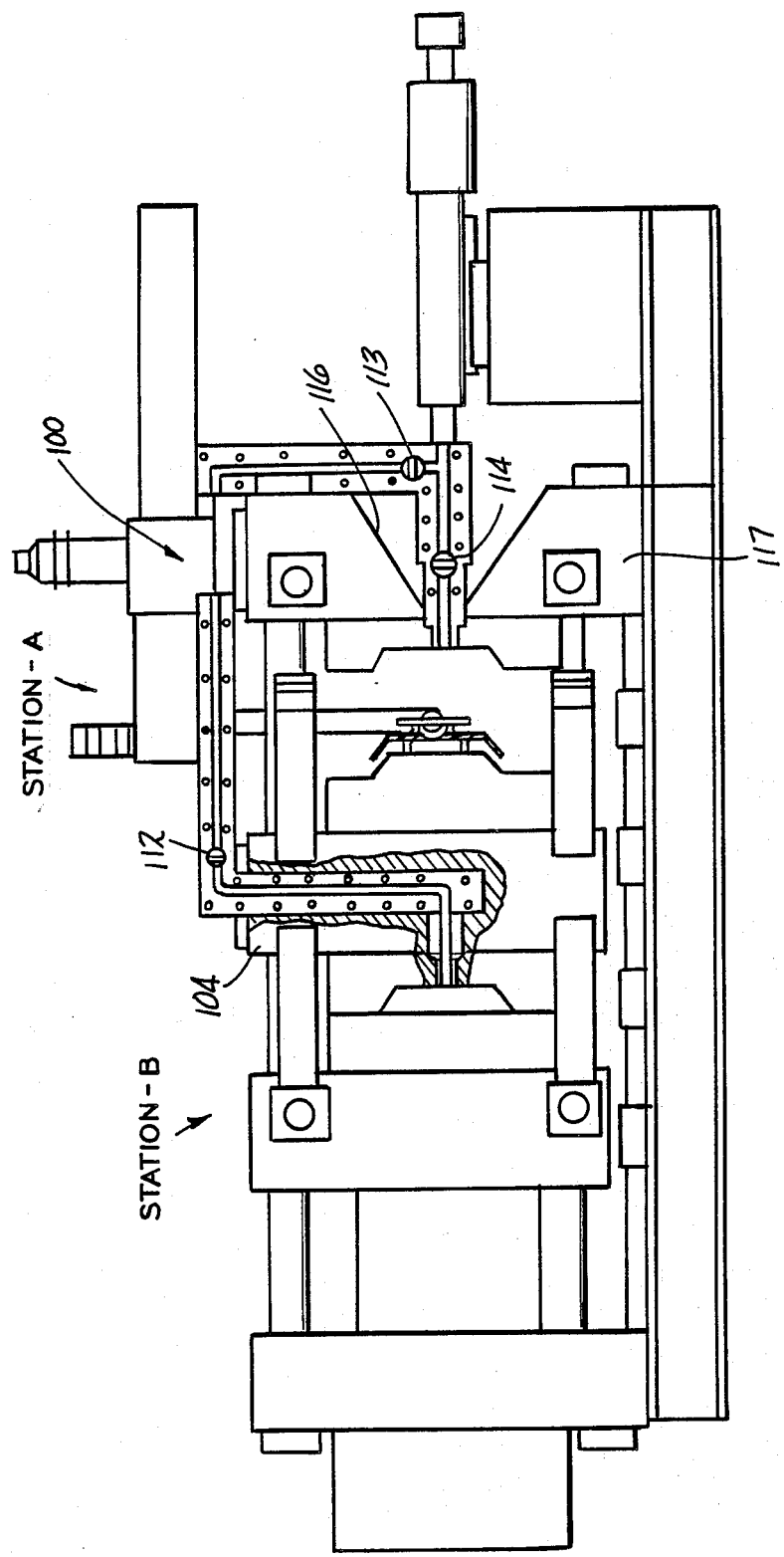
FIG. 16 is a side view of an alternative machine arrangement facilitating molding piece parts in the same physical orientation using a single primary injection means.

FIG. 16 shows a machine arrangement in which a single primary injection unit is utilized to mold parts at stations A and B where each part is molded in the same physical and spatial orientation. Significantly, in this arrangement, the robot head requires only a single pick up unit in that each mold part is grasped while disposed in the same orientation.

In this machine configuration a segment of the molten plastic flow channel leading to station B is carried by and reciprocates with the central platen 104 and is separable from the flow channel serving station A as shown by the reference numeral 100. The flow channels operate to supply the mold at station B when valves 112 and 113 are open and valve 114 is closed. After injection and suitable holding at station B valves 112 and 113 are closed, valve 114 is opened and molten plastic is injected into the mold at station A at the appropriate time in the molding cycle. In order to facilitate this arrangement, a conical cut out 116 is formed in the stationary platen 117.

Depending, for example, upon the similarity of molded parts and cooling time required, use of a secondary injection unit or stuffer is optional. Correspondingly, use of secondary clamp units is also an optional accessory. The necessity for secondary clamping units depends primarily on the relative cooling rates of the parts molded at each station.

Figure 17:
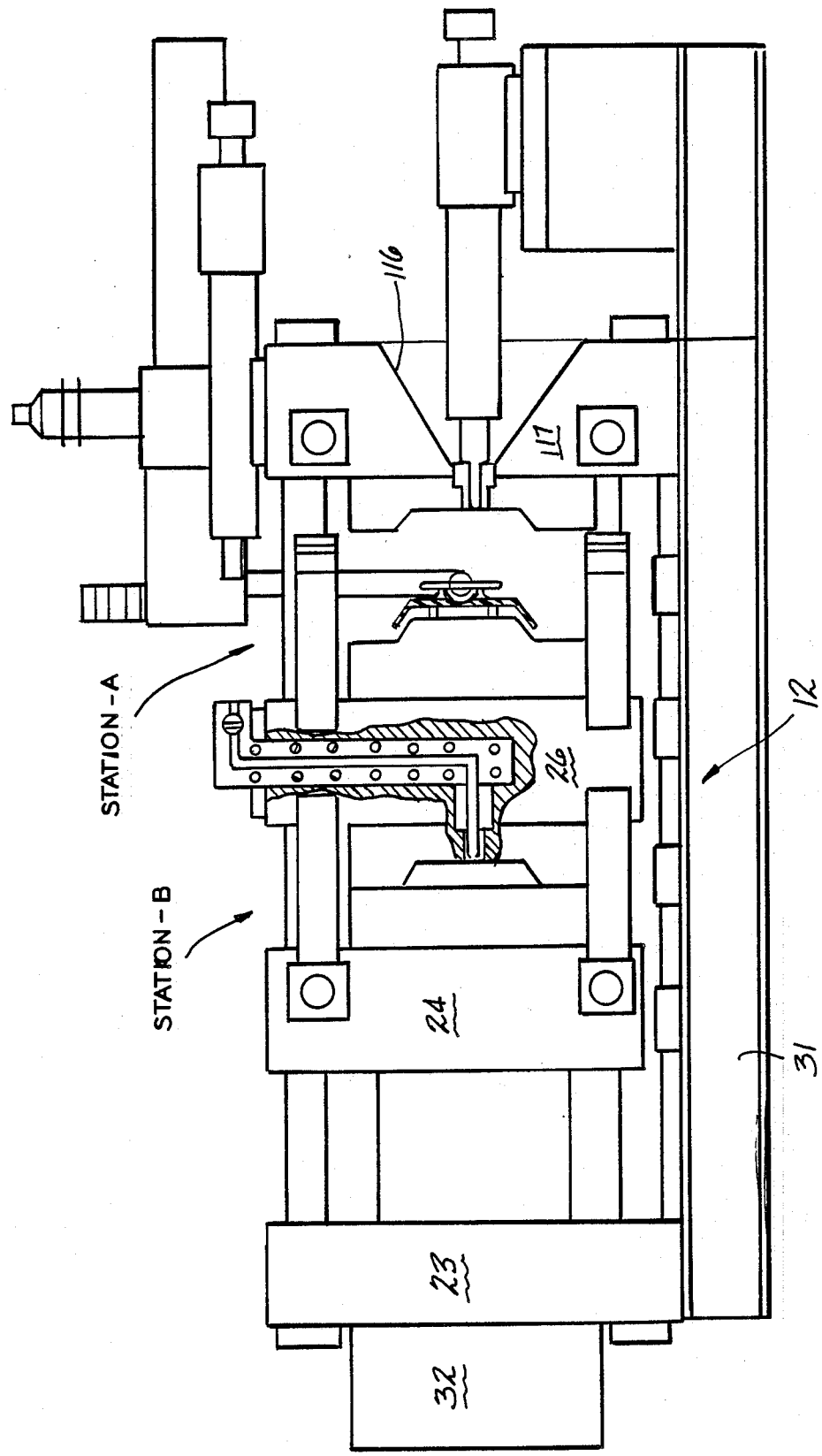
FIG. 17 is similar to FIG. 16 modified to use two primary injection units.

FIG. 17 shows a modification of the arrangement of FIG. 16 in which two primary injection units are utilized, one servicing molding station A and the another servicing station B. In this arrangement, stuffer units are unnecessary in that the primary injection units act dually to perform the mold filling and mold stuffing function.

FIG. 18 is a chart of the molding cycle of FIG. 17 indicating the various positions of machine accessories during the course of molding, cooling and ejecting piece parts from stations A and B sequentially.

When using more than one injection means, different resins may be injected into different mold cavities or different resins may be coinjected in the same mold cavity to gain a layered wall structure.

It is to be understood that the invention is not limited to the illustrations described and shown herein, which are deemed to be merely illustrative of the best modes of carrying out the invention, and which are susceptible of modification of form, size, arrangement of parts an details of operation. The invention rather is intended to encompass all such modifications which are within its spirit and scope as defined by the claims.

What is claimed is:

1. A process for molding plastic parts utilizing an injection molding machine having primary and secondary injection means operating at primary and secondary injection pressures, respectively, and primary and secondary clamping means including clamping control means for clamping at least one first mold located at a first molding station and at least one second mold located at a second molding station, said molds comprising cooperating mold halves supported by fixed and movable platens, said platens being arranged in tandem and one movable platen supporting said secondary injection means, comprising the steps of:
   providing a molten plastic distributor means on said one movable platen operable to communicate, selectively, with one of said cooperating mold halves at each molding station,
   closing and clamping said molds, wherein said molds are clamped at each station by the primary clamping means and the secondary clamping means in combination,
   injecting a molten plastic from said primary injection means at said primary injection pressure through said distributor means into said first clamped mold at a first molding station to fill said first clamped mold,
   cooling the molten plastic in said first clamped mold, and injecting sufficient molten plastic to fill said second mold at said second molding station from said primary injection means at said primary injection pressure and cooling the molten plastic in said second clamped mold,
   maintaining secondary injection pressures by said secondary injection means at said first and second molds for a sufficient interval after filling and during cooling to compensate for shrinkage,
   unclamping and opening said first mold, and removing the molded part.

2. The process of claim 1 wherein one mold at each station is clamped by said secondary clamping means solely independently of said primary clamping means.

3. The process of claim 2 wherein said secondary clamping means is utilized to clamp mold platens.

4. The process of claim 2 wherein said secondary clamping means is utilized to clamp molds directly.

5. The process of claim 1 wherein the first and second molds are cooled during equal simultaneous time intervals.

6. The process of claim 1 wherein the first and second molds are cooled during unequal time intervals.

7. The process of claim 1 plus the step of removing the molded part by means of robot automatically.

8. The process of claim 1 plus the step of stuffing said first mold via said secondary injection means at said secondary injection pressure prior to the cooling step.

9. The process of claim 1 wherein the step of injecting sufficient molten plastic to fill said second mold at said second molding station occurs after filling said first mold from said primary injection means at said primary injection pressure.

10. A process for molding plastic parts utilizing an injection molding machine having primary and secondary injection means and primary and secondary clamping means to clamp at least one first mold located at a first molding station and at least one second mold located at a second mold station comprising the steps of:
    providing a molten plastic distributor means communicating with said first and second molding stations,
    closing and clamping said molds,
    injecting a molten plastic into said clamped molds to fill said molds utilizing the primary injection means at a primary injection means pressure,
    maintaining pressure at the first station after filling and during cooling by utilizing the primary injection means pressure,
    maintaining pressure at the second station after filling and during cooling by utilizing a secondary injection means pressure,
    cooling the molten plastic in both said molds,
    unclamping the opening said molds, and
    removing the molded parts.

* * * * *

UNITED STATES PATENT AND TRADEMARK OFFICE
CERTIFICATE OF CORRECTION

PATENT NO. : 4,867,938

DATED : September 19, 1989

INVENTOR(S) : ROBERT D. SCHAD and PAUL P. BROWN

It is certified that error appears in the above-identified patent and that said Letters Patent is hereby corrected as shown below:

In Column 4, line 35, before "double" delete "shows" and insert --showing--.

In Column 5, line 44, before "station A" delete "in" and insert --at--.

In Column 5, line 57, delete "FIG." and insert --FIGS.--.

In Column 6, line 9, delete "hand" and insert --head--.

In Column 6, line 16, delete "shows" and insert --showing--.

In Column 6, line 29, "plastericizing" should read --plasticizing--.

In Column 6, line 32, delete "second" and insert --secondary--.

In Column 6, line 47, before "alternative" insert --an--.

In Column 9, line 7, after "parts" delete "an" and insert --and--.

In Column 10, claim 7, line 16, after "of" insert --a--.

UNITED STATES PATENT AND TRADEMARK OFFICE
CERTIFICATE OF CORRECTION

PATENT NO. : 4,867,938

DATED : September 19, 1989

INVENTOR(S) : ROBERT D. SCHAD and PAUL P. BROWN

It is certified that error appears in the above-identified patent and that said Letters Patent is hereby corrected as shown below:

In Column 10, claim 10, line 45, delete "the" and insert --and--.

Signed and Sealed this

Eighth Day of January, 1991

Attest:

HARRY F. MANBECK, JR.

*Attesting Officer*      *Commissioner of Patents and Trademarks*

REEXAMINATION CERTIFICATE (3520th)

United States Patent [19]

Schad et al.

[11] B1 4,867,938

[45] Certificate Issued May 26, 1998

[54] SEQUENTIAL INJECTION MOLDING PROCESS

[75] Inventors: Robert D. Schad, Toronto; Paul P. Brown, Orangeville, both of Canada

[73] Assignee: Husky Injection Molding Systems Ltd., Bolton, Canada

Reexamination Request:
No. 90/004,482, Dec. 13, 1996

Reexamination Certificate for:
Patent No.: 4,867,938
Issued: Sep. 19, 1989
Appl. No.: 150,157
Filed: Jan. 29, 1988

Certificate of Correction issued Jan. 8, 1991.

[51] Int. Cl.$^6$ ............................................. B29C 45/12
[52] U.S. Cl. ......................... 264/297.2; 264/328.8; 264/328.13; 264/334; 425/557; 425/588; 425/595
[58] Field of Search ..................... 264/297.2, 297.4, 264/328.8; 425/588, 595, 572

[56] References Cited

U.S. PATENT DOCUMENTS

| | | | |
|---|---|---|---|
| 3,647,338 | 3/1972 | Ise | 425/567 |
| 3,947,208 | 3/1976 | Broderick | 425/436 R |
| 4,400,341 | 8/1983 | Sorensen | 264/328.8 |
| 4,464,327 | 8/1984 | Sorensen | 264/328.8 |
| 4,990,299 | 2/1991 | Sorensen | 264/297.4 |
| 5,023,039 | 6/1991 | Sorensen | 264/297.2 |

*Primary Examiner*—Jill L. Heitbrink

[57] ABSTRACT

An injection molding machine and method of operation having a plurality of accessory arrangements for molding a plurality of piece parts in efficient overlapping time cycle using primary and secondary molten plastic injection units, primary and secondary clamping units, a plurality of injection units in various arrays including molding piece parts in reverse or uniform orientation.

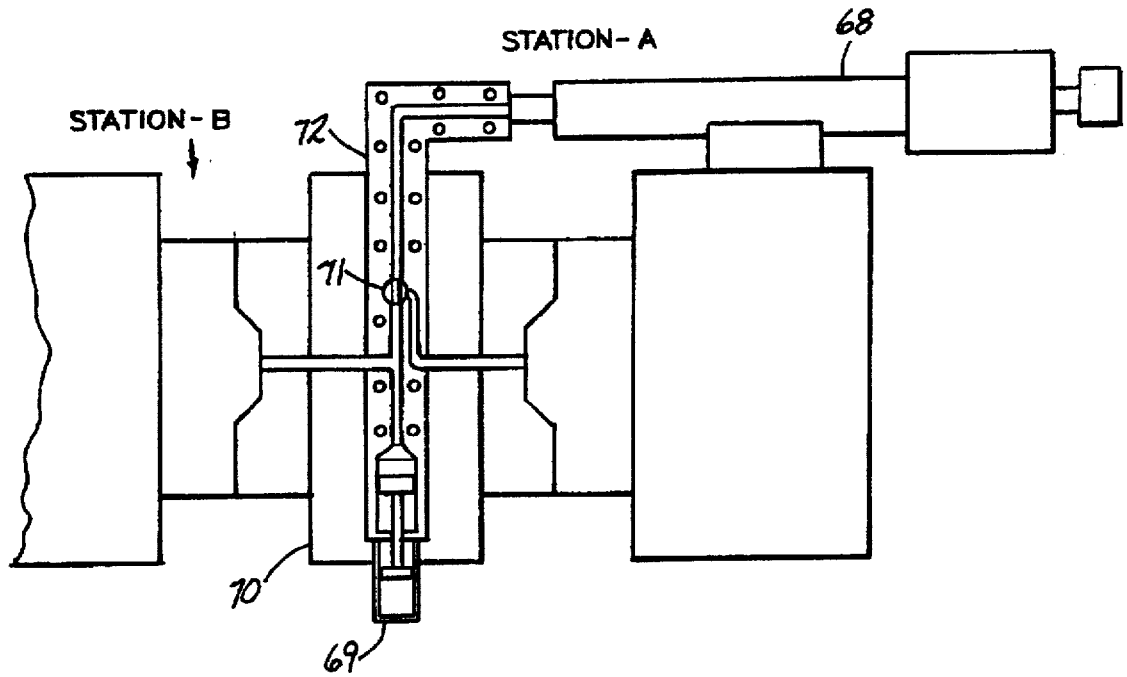

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 10 is confirmed.

Claims 1 and 5–9 are determined to be patentable as amended.

Claims 2–4, dependent on an amended claim, are determined to be patentable as amended.

1. A process for molding plastic parts utilizing an injection molding machine having *multiple* primary and *multiple* secondary injection means operating at primary and secondary injection pressures, respectively, and primary and secondary clamping means including clamping control means for clamping [at least one first mold] *a plurality of molds* located at a [first molding station and at least one second mold located at a second molding station] *plurality of molding stations,* said molds comprising cooperating mold halves supported by fixed and movable platens, said platens being arranged in tandem and [one] *including* movable [platen] *platens* supporting said *multiple* secondary injection means, comprising the steps of:

providing [a] molten plastic distributor means on *two of* said [one] movable [platen] *platens* operable to communicate, selectively, with one of said cooperating mold halves at each molding station, closing and clamping said molds, wherein said molds are clamped at each station by the primary clamping means and secondary clamping means in combination, injecting a molten plastic from said primary injection means at said primary injection pressure through [said] *a first molten plastic* distributor means *associated with a first one of said movable platens* into [said] *a first* clamped mold at a first molding station to fill said first clamped mold *and through a second molten plastic distributor means associated with a second one of said movable platens into a second clamped mold at a second molding station to fill said second clamped mold.* cooling the molten plastic in said first *and second* clamped [mold] *molds,* and injecting sufficient molten plastic to fill [said second mold at said second molding station] *a third clamped mold at a third molding station via said first molten plastic distributor means and a fourth clamped mold at a fourth molding station via said second molten plastic distributor means* from said primary injection means at said primary injection pressure and cooling the molten plastic in said [second] *third and fourth* clamped [mold] *molds,* maintaining secondary injection pressures by said secondary injection means at said first [and] second, *third and fourth* molds for a sufficient interval after filling and during cooling to compensate for shrinkage, unclamping and opening said first [mold] *and second molds by releasing said primary clamping means and said secondary clamping means associated with said first and second molds while said third and fourth molds remain closed and clamped by said secondary clamping means,* and removing the molded part *from said first and second molds.*

5. The process of claim 1 wherein the first [and] second, *third and fourth* molds are cooled during equal simultaneous time intervals.

6. The process of claim 1 wherein the first [and] second, *third and fourth* molds are cooled during unequal time intervals.

7. The process of claim 1 plus the step of *automatically* removing the molded parts *from said mold stations* by means of *two robots* [automatically].

8. The process of claim 1 plus the step of stuffing said first [mold] *and second molds* via said secondary injection means at said secondary injection pressure prior to the cooling step.

9. The process of claim 1 wherein the step of injecting sufficient molten plastic to fill said [second] *third* mold at said [second] *third* molding station *and to fill said fourth mold at said fourth molding station* occurs after filling said first [mold] *and second molds* from said primary injection means at said primary injection pressure.

* * * * *